(12) United States Patent
Houjou et al.

(10) Patent No.: US 9,852,503 B2
(45) Date of Patent: Dec. 26, 2017

(54) DIAGNOSTIC APPARATUS FOR LESION, IMAGE PROCESSING METHOD IN THE SAME APPARATUS, AND MEDIUM STORING PROGRAM ASSOCIATED WITH THE SAME METHOD

(71) Applicant: CASIO COMPUTER CO., LTD., Shibuya-ku, Tokyo (JP)

(72) Inventors: Yoshiharu Houjou, Tokyo (JP); Nobuhiro Aoki, Kokubunji (JP); Shigeki Mineo, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 14/980,642

(22) Filed: Dec. 28, 2015

(65) Prior Publication Data
US 2016/0189377 A1 Jun. 30, 2016

(30) Foreign Application Priority Data

Dec. 26, 2014 (JP) .................. 2014-263717

(51) Int. Cl.
*G06K 9/00* (2006.01)
*G06T 7/00* (2017.01)
(Continued)

(52) U.S. Cl.
CPC ........ *G06T 7/0012* (2013.01); *G06K 9/00536* (2013.01); *G06T 5/003* (2013.01);
(Continued)

(58) Field of Classification Search
CPC ...... G06K 9/00536; G06T 2207/10024; G06T 2207/10056; G06T 2207/20028;
(Continued)

(56) References Cited

U.S. PATENT DOCUMENTS

2008/0194928 A1* 8/2008 Bandic ............... G06Q 30/0631
600/306
2008/0226151 A1 9/2008 Zouridakis et al.
(Continued)

FOREIGN PATENT DOCUMENTS

JP 08266480 A 10/1996
JP 2004097830 A 4/2004
(Continued)

OTHER PUBLICATIONS

Sato et al. ("Improved Detection of Dermoscopic Structures by High Dynamic Range Image Conversion"; Japanese Journal of Dermatology; vol. 123, No. 2, Feb. 2013, pp. 121-131.*
(Continued)

*Primary Examiner* — Bhavesh Mehta
*Assistant Examiner* — Ian Lemieux
(74) *Attorney, Agent, or Firm* — Holtz, Holtz & Volek PC

(57) ABSTRACT

The invention provides a method of processing an image in a diagnostic apparatus 100 of diagnosing a lesion using a captured image of an affected area to be diagnosed, comprising the steps of: (i) classifying the captured image based on a stage of a progression of the lesion (Step S13 and S14); and (ii) performing an image conversion processing, which corresponds to a classification obtained as a result of step (i), on the captured image to generate a converted image (Step S15-17).

16 Claims, 12 Drawing Sheets

(51) Int. Cl.
*G06T 5/00* (2006.01)
*G06T 7/11* (2017.01)
*G06T 7/90* (2017.01)

(52) U.S. Cl.
CPC ............... *G06T 5/007* (2013.01); *G06T 7/11* (2017.01); *G06T 7/90* (2017.01); *G06T 2207/10024* (2013.01); *G06T 2207/10056* (2013.01); *G06T 2207/20028* (2013.01); *G06T 2207/30088* (2013.01); *G06T 2207/30096* (2013.01); *G06T 2207/30101* (2013.01)

(58) Field of Classification Search
CPC . G06T 2207/30088; G06T 2207/30096; G06T 2207/30101; G06T 5/003; G06T 5/007; G06T 7/0012; G06T 7/90; G06T 7/11
See application file for complete search history.

(56) References Cited

U.S. PATENT DOCUMENTS

| | | | |
|---|---|---|---|
| 2008/0275315 | A1 | 11/2008 | Oka et al. |
| 2009/0220141 | A1 | 9/2009 | Aoki et al. |
| 2011/0096201 | A1 | 4/2011 | Yoo et al. |
| 2012/0301024 | A1* | 11/2012 | Yuan ............... H04N 1/624 382/167 |
| 2016/0133011 | A1* | 5/2016 | Nakajima ............ G06T 5/009 382/128 |

FOREIGN PATENT DOCUMENTS

| | | | |
|---|---|---|---|
| JP | 2005192944 A | 7/2005 |
| JP | 2008289923 A | 12/2008 |
| JP | 2009211313 A | 9/2009 |
| JP | 2014004252 A | 1/2014 |

OTHER PUBLICATIONS

S. Fischer, P. Schmid, and J. Guillod, "Analysis of skin lesions with pigmented networks," in Proc. Int. Conf. Image Processing, vol. 1, 1996, pp. 323-326.*

Partial European Search Report dated Jun. 7, 2016, issued in counterpart European Application No. 15202418.8.

"Handbook of Image and Video Processing, 4.2 Multiplicative Image Scaling, 5 Image Sharpening ED",—Bovik, Alan C. (editor), Jan. 1, 2000, Academic Press, pp. XIII, 26-27 and 95-97.

D'Alessandro, et al., "Computer Aided Analysis of Epi-illumination and Transillumination Images of Skin Lesions for Diagnosis of Skin Cancers", Engineering in Medicine and Biology Society, 33rd Annual International Conference of the IEEE EMBC, Sep. 3, 2011, pp. 3434-3438.

Saez, "Segmentation and classifcation of dermatological lesions", Medical Imaging 2010: Computer-Aided Diagnosis, vol. 7624, 76243L, Feb. 13, 2010, pp. 1-7.

Extended European Search Report dated Aug. 23, 2016 in counterpart European Application No. 15202418.8.

Cheung, et al., "Mobile Imaging System for Early Diagnosis of Skin Cancer", IEEE Life Sciences, Jan. 1, 2014, Retrieved from the Internet: URL: http://lifesciences.ieee.org/publications/newsletter/january-2014/482-mobile-imaging-system-for-early-diagnosis-of-skin-cancer.

Do, et al., "Early Melanoma Diagnosis with Mobile Imaging", 2014 36th Annual International Conference of the IEEE Engineering in Medicine and Biology Society, Aug. 26, 2014, pp. 6752-6757.

Jyothilakshmi, et al., "Detection of Malignant Skin Diseases Based on the Lesion Segmentaion", International Conference on Communication and Signal Processing, Apr. 3-5, 2014, India, pp. 382-386.

Kwang, et al., "Segmentation and grading of eczema skin lesions", 2014 8th International Conference on Signal Processing and Communication Systems (ICSPCS), IEEE, Dec. 15, 2014, pp. 1-5.

Onkaew, et al., "Automatic Vessel Extraction with Combined Bottom-hat and Match-Filter", International Conference on Information and Communication Technology for Embedded Systems, Jan. 27, 2011, pp. 101-105.

Japanese Office Action (and English translation thereof) dated Jan. 1, 2017, issued in counterpart Japanese Application No. 2014-263717.

Japanese Office Action (and English translation thereof) dated Mar. 28, 2017, issued in counterpart Japanese Application No. 2014-263717.

* cited by examiner

DIAGNOSTIC APPARATUS FOR LESION, IMAGE PROCESSING METHOD IN THE SAME APPARATUS, AND MEDIUM STORING PROGRAM ASSOCIATED WITH THE SAME METHOD

CROSS-REFERENCE TO RELATED APPLICATIONS

This application claims priority from Japanese Patent Application No. 2014-263717 filed on Dec. 26, 2014, which is incorporated herein by reference.

TECHNICAL FIELD

The present invention relates to a diagnostic apparatus for a lesion, and an image processing method in the same apparatus, and a medium storing program associated with the same method.

BACKGROUND ART

Generally, visual inspection is necessarily performed to diagnose a cutaneous legion, thereby obtaining an amount of information. However, not only discrimination between a mole and a spot but also discrimination between a benign tumor and a malignant tumor are substantially difficult with a naked eye inspection and even a magnifying glass inspection. For the reasons, dermoscopic inspection in which a dermoscope-equipped camera is used to capture an image of a disease has been conventionally performed.

The dermascope is a noninvasive diagnostic device in which a disease irradiated with light from, for example, a halogen lamp, and unobstructed by reflective light due to echo gel or a polarization filter is magnified (typically ×10) and subjected to observation. A dermoscopic diagnosis can be defined as the inspection of skin diseases with the dermoscope. For more detail, see internet URL (http://www.twmu.ac.jp/DNH/department/dermatology/dermoscopy.html) (accessed on Sep. 1, 2014). In accordance with the dermoscopic diagnosis, scattered reflection occurring due to a cuticle is eliminated, thereby rendering the distribution of pigmentation from an epidermis to a superficial intradermal layer increasingly visible.

For example, Patent Literature 1 (Japanese patent publication No. 2005-192944 (A)) discloses technologies of a remote diagnosis apparatus of diagnosing a pigmented skin disease employing a value such as color, a texture, an asymmetricity, and a circularity based on an image of a skin captured by the dermoscope. In accordance with Patent Literature 1, a portable phone provided with a dermoscope-equipped camera is used, and an image of a skin having a disease of a benign nevus pigmentosus and etc. and having a risk of a melanoma is captured by the dermoscope. The portable phone is connected to an internet due to its network connecting function, and the image of the skin captured is transmitted via the internet to the remote diagnosis apparatus to request a diagnosis. Upon receiving the image of the skin based on the request, the remote diagnosis apparatus uses a melanoma diagnosis program to determine whether based on the image of the skin the disease is a melanoma or not, or in a case where the disease is the melanoma, which stage of the melanoma is. The determination as a result is transmitted to a physician having requested the diagnosis.

While the diagnosis based on the afore-mentioned dermoscopic image has become widely used, in order to obtain clear shape change or pattern HDR (high dynamic range imaging) has conventionally performed on the captured dermoscopic image. In this case, as an image conversion is uniformly performed regardless of the type of lesion or the stage or degree of progression, satisfactory diagnostic accuracy is hard to obtain, and the diagnosis actually depends on a skill of a physician or clinician.

CITATION LIST

Patent Literature

[Patent Literature 1] Japanese patent publication No. 2005-192944 (A)

SUMMARY OF INVENTION

In order to overcome the afore-mentioned drawbacks or problems, in accordance with a first aspect of the invention, there is provided a method of processing an image in a diagnostic apparatus of diagnosing a lesion using a captured image of an affected area to be diagnosed, comprising the steps of: (i) classifying the captured image based on a stage of a progression of the lesion; and (ii) performing an image conversion processing, which corresponds to a classification obtained as a result of step (i), on the captured image to generate a converted image.

In accordance with a second another aspect of the invention, there is provided with a diagnostic apparatus of diagnosing a lesion using a captured image of an affected area to be diagnosed, comprising: an image-memorizing unit configured to memorize the captured image; and a processing unit configured to process the captured image memorized in the image-memorizing unit, the processing unit comprising classifying means for classifying the captured image based on a stage of a progression of the lesion, wherein an image conversion processing, which corresponds to a classification made by the classifying means, is performed on the captured image to generate a converted image.

In accordance with a third aspect of the invention, there is provided a non-transitory computer readable medium storing a program of processing an image in a diagnostic apparatus of diagnosing a lesion using a captured image of an affected area to be diagnosed, the program causing a computer to execute: a step of memorizing the captured image, and a step of processing the captured image memorized, and comprising (i) classifying the captured image based on a stage of a progression of the lesion; and (ii) performing an image conversion processing, which corresponds to a classification obtained as a result of (i), on the captured image to generate a converted image.

DESCRIPTION OF EMBODIMENTS

Figure 1:
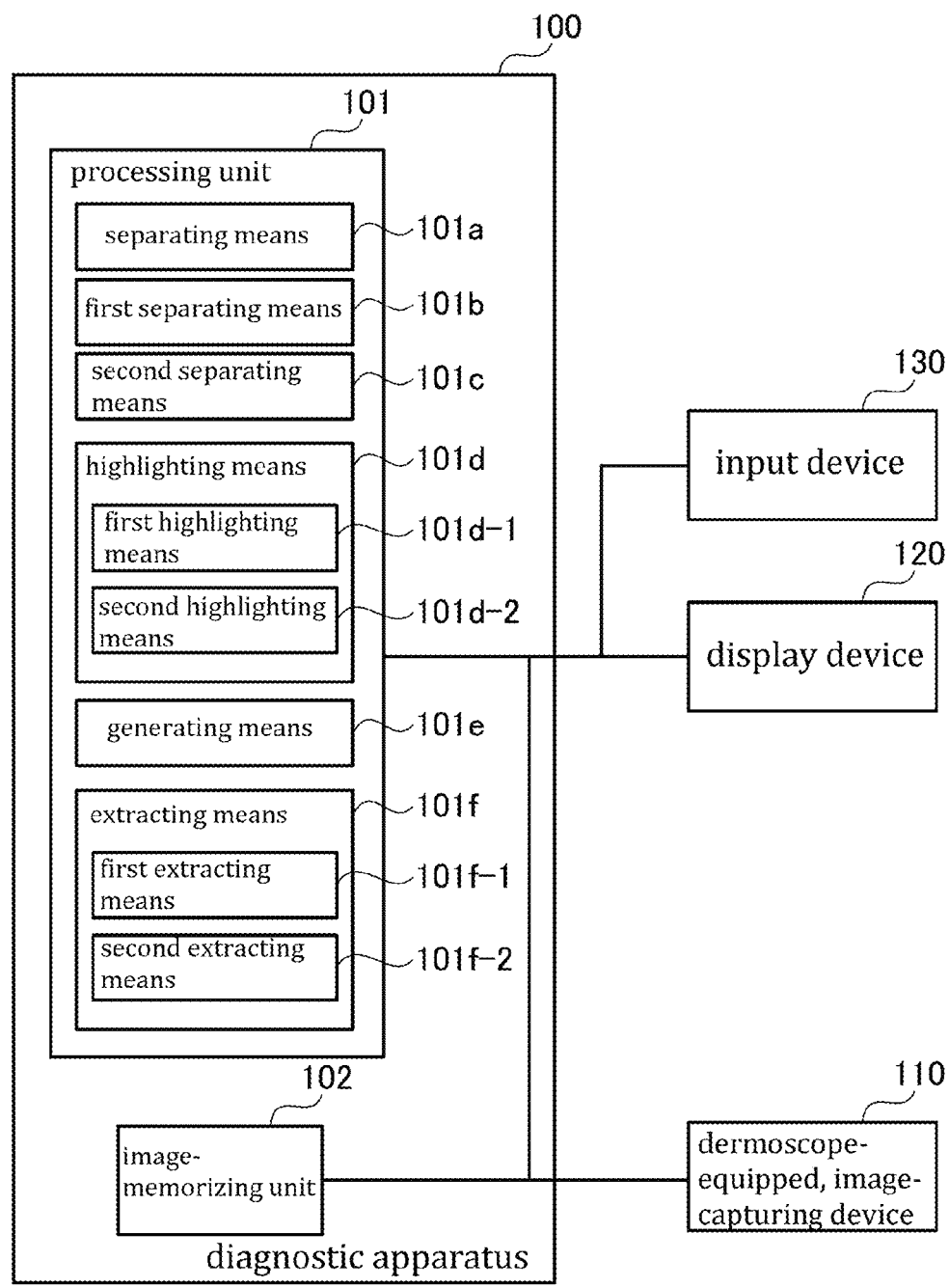
FIG. 1 is a block diagram showing a configuration of one embodiment of a diagnostic apparatus in accordance with the invention.

Referring to the accompanying drawings, an embodiment of the invention will be hereinafter described in detail. Furthermore, the same reference numeral is assigned to the same element or part throughout the overall specification.

Configuration of Embodiment

FIG. 1 is a block diagram showing a configuration of a diagnostic apparatus 100, one embodiment of the diagnostic apparatus in accordance with the invention. Referring to FIG. 1, an image-capturing device 110 equipped with a dermoscope, which can be hereinafter designated as an "image-capturing device 110" or "dermoscope-equipped, image-capturing device 110" throughout the specification, is connected to the diagnostic apparatus 100. The dermoscope-equipped, image-capturing device 110 is configured to capture an image in accordance with an instruction from the diagnostic apparatus 100 (in particular, a processing unit 101), memorize the captured image such as a dermoscopic image in an image-memorizing unit 102, and display the captured image on a predetermined area of a display device 120. Furthermore, the captured image is highlighted by the processing unit 101, and then memorized in the image-memorizing unit 102 and displayed on the predetermined area of the display device 120. An input device 130 is configured to perform an instruction for starting to capture an image such as a dermoscopic image, and a selection of a region in the dermoscopic image, which will be described below.

The display device 120 may be a LCD (Liquid Crystal Display) monitor, and the input device 130 may be a mouse.

The processing unit 101 is configured to process the captured image as memorized in the image-memorizing unit 102. Referring to FIG. 1, the processing unit 101 has classifying means 101a, first separating means 101b, second separating means 101c, highlighting means 101d, generating means 101e, and extracting means 101f.

The classifying means 101a function as means for classifying a captured image of an affected area to be diagnosed, based on the stage of progression of the affected area. The classifying means 101a of the processing unit 101 perform an image conversion processing corresponding to the classification, which is made by the classifying means 101a, to generate a converted image.

In this case, the image-memorizing unit 102 memorizes the captured images based on the classification thereof, and the classifying means 101a classify the captured image of the affected area to be diagnosed based on the stage of progression with reference to the captured image as memorized in the image-memorizing unit 102.

Furthermore, the image conversion processing which is performed by the processing unit 101 may include a structure clarifying conversion processing (i.e., a tissue-clarifying conversion processing) that is an image conversion processing corresponding to the classification of a low stage of progression; a region highlighting conversion processing that is an image conversion processing corresponding to the classification of a middle stage of progression; and a region fluorescent coloring conversion processing that is an image conversion processing corresponding to the classification of a high stage of progression.

The classifying means 101a classify an image where the affected area is mole-shaped, and substantially composed of black or brown color as the classification of the low stage of progression (Type I).

The classifying means 101a classify an image where the affected area is mole-shape, and partially composed of vessels as the classification of the middle stage of progression (Type II).

The classifying means 101a label an image where the affected area is mole-shaped, and wholly composed of reddish vessels as the classification of the high stage of progression (Type III).

[Structure Clarifying Conversion]

When the processing unit 101 performs the structure clarifying conversion processing, the first separating means 101b function as means for separating the captured image into a brightness component and a color information component, and the second separating means 101c function as means for separating the brightness component a base component (also called a "large-scale component") and a detail component. For reference, the term "base component" as used herein means a brightness component having globally-varying properties, and the term "detail component" as used herein means the brightness component having locally-varying properties.

The highlighting means 101d has at least one of a first highlighting means 101f-1 which function as means for performing a highlighting processing on the base component to compress the base component in a manner brighter than a center value and a second highlighting means 101f-2 which function as means for performing a sharpness filter processing on the base component.

During the highlighting processing as defined herein, the term "compress" is interchangeable with the term "attenuate".

The generating means 101e function as means for restoring a brightness from a highlighted base component and the particular component and using the color information component to generate a highlighted image. The generating means 101e add the highlighted base component to the detail component to restore the brightness, and perform a conversion to a second color space based on a restored brightness and the color information component corresponding to a direction of a red-based color and a direction of a blue-based color in a first color space to generate the highlighted image.

[Region Highlighting Conversion]

When the processing unit 101 performs the region highlighting conversion processing, the first separating means 101b function as means for separating the captured image into the brightness component and the color information component, and the extracting means 101f function as means for extracting a region to be diagnosed.

In this regard, the extracting means 101f has at least one of a first extracting means 101f-1 for extracting a candidate region based on the brightness component and a second extracting means 101f-2 for extracting a likelihood of the region based on a color space composed of the brightness component and the color information component. In the region highlighting conversion processing, the second extracting means 101f-2 use the color information component corresponding to the direction of the red-based color in the color space during the extraction.

[Region Fluorescent Coloring Conversion]

When the processing unit 101 performs the region highlighting conversion processing, the first separating means 101b function as means for separating the captured image into a brightness component and a color information component, and the extracting means 101f function as means for extracting a region to be diagnosed.

In this regard, the extracting means 101f has at least one of a first extracting means 101f-1 for extracting a candidate region based on the brightness component to perform a bottom-hat processing on the candidate region extracted and a second extracting means 101f-2 for extracting a likelihood of the region based on a color space composed of the brightness component and the color information component. In the region fluorescent coloring conversion processing, the second extracting means 101f-2 use the color information component corresponding to the direction of a green-based color in the color space during the extraction.

Each of the classifying means 101a, the first separating means 101b, the second separating means 101c, the highlighting means 101d (i.e., the first highlighting means 101d-1 and the second highlighting means 101d-2), the generating means 101e, and the extracting means 101f (i.e., the first extracting means 101f-1 and the second extracting means 101f-2) as described above can execute the aforementioned original function thereof by the processing unit 101's sequentially reading a program in accordance with an embodiment of the invention, owned by the processing unit 101.

Operation of Embodiment

The operation (i.e., an image processing method) of the diagnostic apparatus 100 as shown in FIG. 1 is described in detail with reference to FIG. 2 and below. Furthermore, each of operations or steps which will be hereinafter described can cause a computer to execute a corresponding function using an image processing program in the diagnostic apparatus 100.

Figure 2:
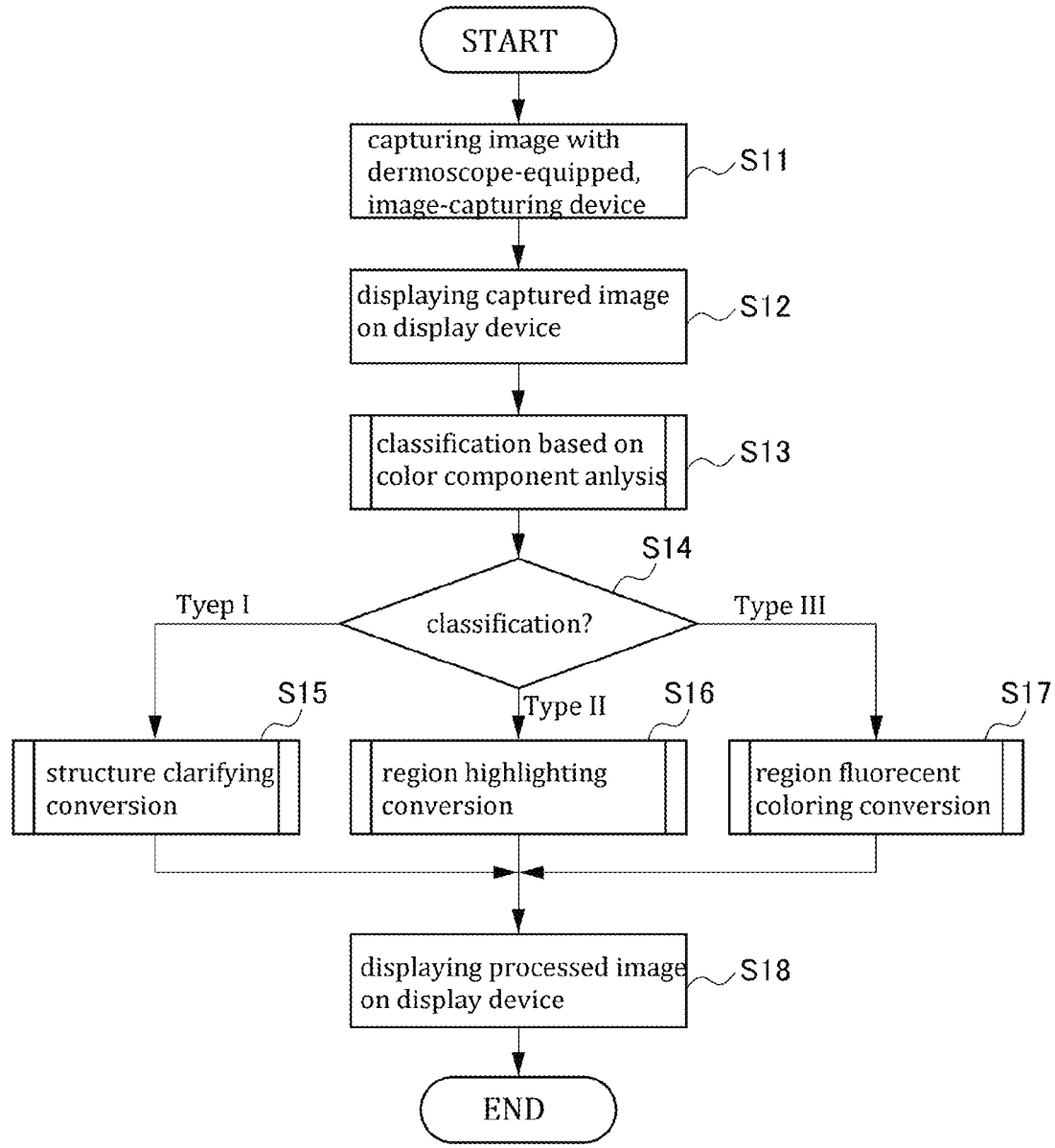
FIG. 2 is a flow chart illustrating a basic processing operation of one embodiment of a diagnostic apparatus in accordance with the invention.

FIG. 2 depicts the flow of basic processing operation of the diagnostic apparatus 100 in accordance with the embodiment of the invention. Referring to FIG. 2, the processing unit 101 firstly acquires an image of an affected area (e.g., a cutaneous lesion) that is captured by the dermoscope-equipped, image-capturing device 110 (Step S11). Then, the captured image as acquired is memorized in the predetermined area of the image-memorizing unit 102, and is displayed on the display device 120 (Step S12).

Subsequently, in a step of classification the classifying means 101a of the processing unit 101 make a classification based on color component analysis (Step S13) and classify the image into at least three types including Type I, Type II, and Type III (Step S14).

The image conversion processing (i.e., the image conversion step) selected from the structure clarifying conversion processing (i.e., the structure clarifying conversion step) (Step S15), the region highlighting conversion processing (i.e., the region highlighting conversion step) (Step S16), and the region fluorescent coloring conversion processing (i.e., the region fluorescent coloring conversion step) (Step S17) based on the type determined in Step S14 is performed, and the processed image and the captured image are displayed in parallel on the display device 120. Diagnosis is left to a physician (Step S18).

In this regard, the classifying means 101a classify an image where an affected area is mole-shaped, and substantially composed of black or brown color as the classification of the low stage of progression (Type I).

The classifying means 101a classify an image where an affected area is mole-shape, and partially composed of vessels as the classification of the middle stage of progression (Type II).

The classifying means 101a classify an image where an affected area is mole-shaped, and wholly composed of reddish vessels as the classification of the high stage of progression (Type III).

In a case where the image is classified as Type I, the structure clarifying conversion processing that is the image conversion processing corresponding to the classification of the low stage of progression is performed.

In a case where the image is classified as Type II, the region highlighting conversion processing that is the image conversion processing corresponding to the classification of the middle stage of progression is performed.

In a case where the image is classified as Type III, the region fluorescent coloring conversion processing that is the image conversion processing corresponding to the classification of the high stage of progression is performed.

Figure 10:
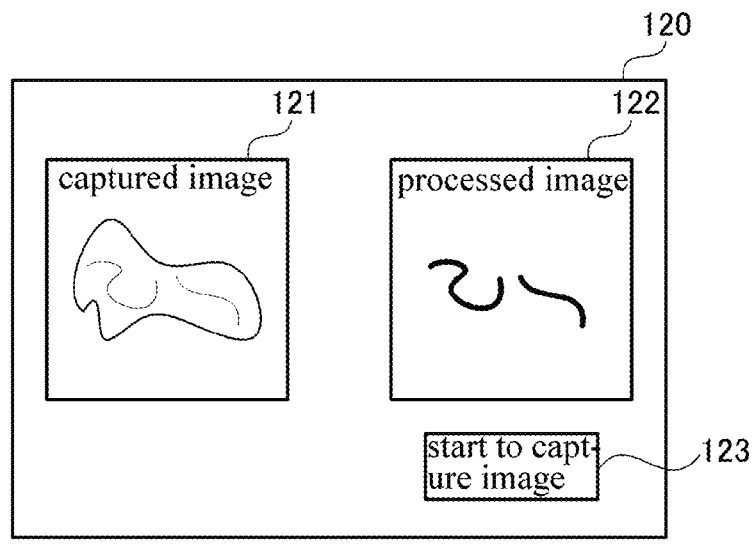
FIG. 10 is an exemplary display screen configuration of an embodiment of a diagnostic apparatus in accordance with the invention.

An exemplary image of a display screen displayed on the display device 120 is shown in FIG. 10. In the screen of FIG. 10, a captured image-displaying section 121 in which the captured image is displayed is arranged at a left side and a processed image-displaying section 122 in which the processed image is displayed is arranged at a right side.

Upon the physician's clicking a button of "start to capture image" 123 which is located at a bottom right of the screen of the display device 120, the dermoscope-equipped, image-capturing device 110 starts to capture the image of the affected area.

Furthermore, the captured image is displayed in the captured image-displaying section 121 and the processed image that is obtained by performing the image conversion processing (i.e., the structure clarifying conversion processing, the region highlighting conversion processing, and the region fluorescent coloring conversion processing) corresponding to Type I-III as classified by the processing unit 101 is displayed in the processed image-displaying section 122 next to the captured image-displaying section 121 on the screen of the display device 120.

In addition, a thumbnail area in which each of the processed images is displayed may be added in an arbitrary location of the screen. In this case, the processed image corresponding to the selected and operated thumbnail may be displayed in the processed image-displaying section 122. A plurality of the processed images may be displayed in parallel.

Figure 3:
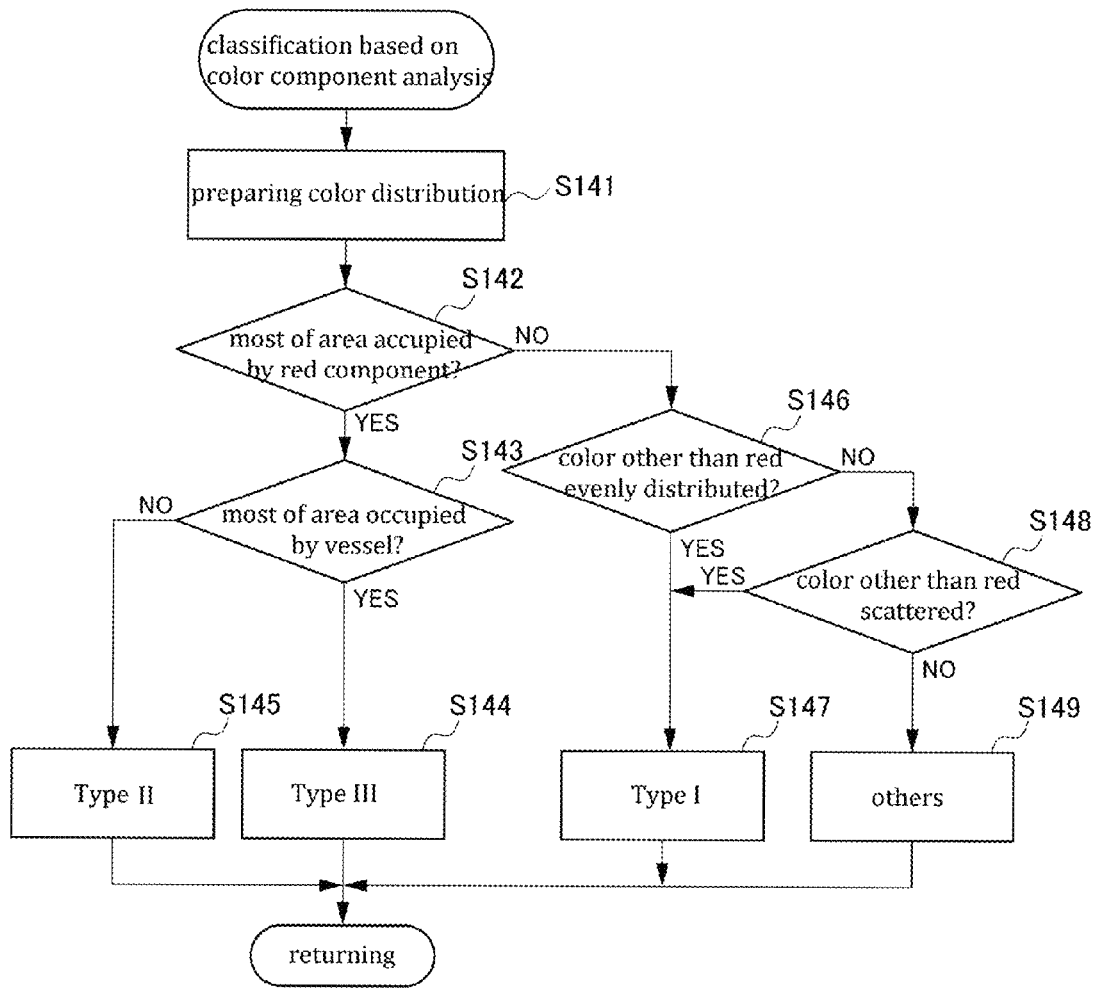
FIG. 3 shows a detailed procedure of a classification processing based on a color component analysis as defined in FIG. 2.

FIG. 3 shows a detailed procedure of classification processing based on the color component analysis as defined in Step S13 of FIG. 2. Referring to FIG. 3, the first separating means 101b of the processing unit 101 firstly convert the captured image that is obtained by the dermoscope-equipped, image-capturing device 110 from RGB color space to Lab color space (more exactly, CIE 1976 L*a*b* color space). The details of the Lab color space are described in, for example, internet URL (http://Ja.wikipedia.org/wiki/lab%E8%89%B2%E7%A9%BA%E9%96%93) (accessed on Sep. 1, 2014). Hereinafter, L, a and b of coordinate axes in the Lab color space are written in bold italics.

Furthermore, the classifying means 101a of the processing unit 101 prepare a histogram indicating a color distribution of a lesion (Step S141), and determine or judge whether eight or above out of ten of the area is occupied by a red-based color component or not (Step S142).

In this regard, if almost all of the area is determined to be occupied by the red-based color component (i.e., "YES" in Step S142), the classifying means 101a classify the case as Type II or Type III.

For this purpose, the classifying means 101a determine or judge whether most of the lesion is vessel-shaped or not (Step S143). If the most of the affected area is vessel-shaped (i.e., "YES" in Step S143), the case is classified as Type III (Step S144).

If "NO" in Step S143, the case is classified as Type II (Step S145).

On the other hand, in a case where the lesion area is not occupied by the red-based color component (i.e., "NO" in Step S142), the classifying means 101a further determine or judge whether the color component(s) other than the red-based color component is evenly distributed or not (Step S146), and whether the color component(s) other than the red-based color component is scattered or not.

If the color component(s) other than the red-based color component is evenly distributed (i.e., "YES" in Step S146) or scattered (i.e., "YES" in Step S148), the case is classified as Type I (Step S147).

If the color component(s) other than the red-based color component is not evenly distributed ("NO" in Step S146) or is not scattered ("NO" in Step S147), the case is classified as others (Step S149).

[Structure Clarifying Conversion]

Figure 4:
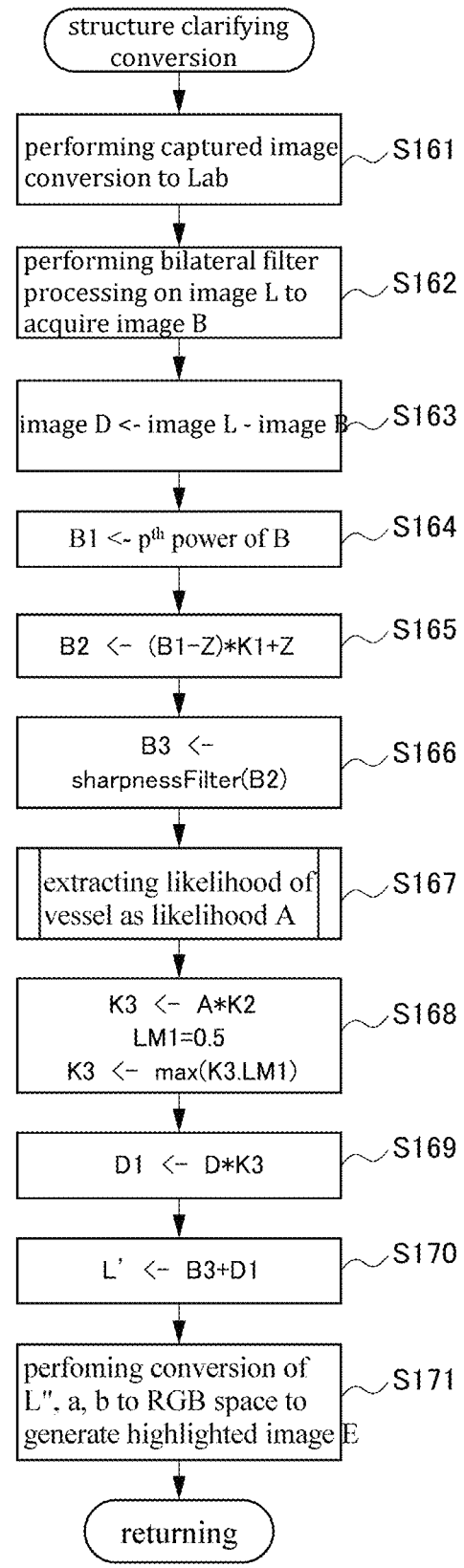
FIG. 4 is a flow chart illustrating a detailed procedure of a structure clarifying conversion processing as defined in FIG. 2.

Next, the structure clarifying conversion processing (i.e., the structure clarifying conversion step) which is performed when the case is classified as Type I will be described with reference to the flow chart of FIG. 4. Referring to FIG. 4, the first separating means 101b of the processing unit 101 convert the captured image that is obtained by the dermoscope-equipped, image-capturing device 110 from RGB color space to Lab color space in a first separation step of the separation steps. Subsequently, the second separating means 101c of the processing unit 101 perform an edge preserving filter processing on an image L to separate the captured image into the base component and the detail component (Step S162). An edge preserving filter which can be used in this edge preserving filter processing may be a bilateral filter. The details of the bilateral filter are described in, for example, internet URL (http://en.wikipedia.org/wiki/Bilateral filter) (accessed on Sep. 1, 2014).

While in the embodiment the captured image is converted from the RGB color space to the Lab color space and is then subjected to processing, the captured image may be converted from the RGB color space to a HSV (Hue, Saturation, Lightness) color space and then subjected to processing. In this case, V component corresponds to the brightness component, and the HS component corresponds to the color information component. The HSV color space is a color space composed of three components, that is, the HSV color space has hue, saturation (chroma), and value (lightness or brightness). The HSV color space can be also called as HSL (Hue, Saturation, Lightness) color space or HSB (Hue, Saturation, Brightness) color space.

Next, in a highlighting step the highlighting means 101d of the processing unit 101 acquire an image B (B=bilateral filter (L)) that is obtained by performing the bilateral filter processing on the image L. In this regard, the image B is a base component image. Next, the highlighting means 101d acquire an image D of the detail component. The image D can be obtained by subtracting the image B from the image L (Step S163).

Subsequently, the highlighting means 101d (in particular, the first highlighting means 101d-1) acquire a highlighted base component image B1 by raising the base component image B to the $p^{th}$ power in the first highlighting step of the highlighting steps (Step S164). In this regard, p is 1 or below. The highlighting means 101d perform the highlighting processing such that a maximum and a minimum which the base component image B may have are not changed before and after modification. Specifically, since the value of the brightness L in the Lab color space is in a range of from 0 to 100, B1 can be determined in accordance with the following mathematical formula: $B1=(B^p)/(100^p)*100$. Next, the highlighting means 101c multiply B1 by K1 employing the value Z as a basis or standard so as to acquire a compressed image B2 (Step 165).

The compressed image B2 can be determined in accordance with the following mathematical formula: $B2=(B1-Z)*K1+Z$. In the above mathematical formula, a coefficient K1 represents a compression ratio of 1 or below, in the embodiment, a range of from 0.2 to about 0.8. Z is set brighter than a center C. C is a center location where the compression is performed, and can be calculated in accordance with the following mathematical formula: $C=(50^p)/(100^p)*100$. Z has a value of from 5% to 50% greater than that of C. In other words, the highlighting means 101c compress the base component in a manner brighter than the center value so as to highlight the base component.

Next, the highlighting means 101d (in particular, the second highlighting means 101d-2) perform sharpness filter processing on the compressed image B2 to generate a sharpened image B3 in the second highlighting step of the highlighting steps (Step S166: B3←sharpness filter (B2)). During the sharpness filter processing, the second highlighting means 101d-2 perform convolution operation of the following kenel M on the compressed image B2. Furthermore, one exemplary convolution matrix (value of convolution kenel M) is shown, as follow:

$$M = \begin{vmatrix} -0.1667 & -0.6667 & -0.1667 \\ -0.6667 & 4.3333 & -0.6667 \\ -0.1667 & -0.6667 & -0.1667 \end{vmatrix}$$

In accordance with the embodiment, the afore-mentioned compression highlighting processing is performed by the first highlighting means 101d-1 in the first highlighting step, and the subsequent sharpness filter processing is performed by the second highlighting means 101d-2 in the second highlighting step. However, the highlighting means 101d does not necessarily perform both of the compression highlighting processing as the first highlighting step and the sharpness filter processing as the second highlighting step, and may perform either of the compression highlighting processing or the sharpness filter processing.

Next, the highlighting means 101d extract a likelihood of vessel as a likelihood A so as to reflect the likelihood of vessel in a degree of highlighting the detail component image D (Step S167). The likelihood of vessel (the likelihood A) has the same dimensional information as the compressed image B2 of the base component in which noise has been removed, and has the likelihood of vessel information (the likelihood A) ranging from 0 to 1 for each pixel. As the likelihood of vessel increases, the value approaches 1. The processing of extracting the likelihood of vessel as the likelihood A as defined in Step S167 is illustrated in the flow chart of FIG. 5.

Figure 5:
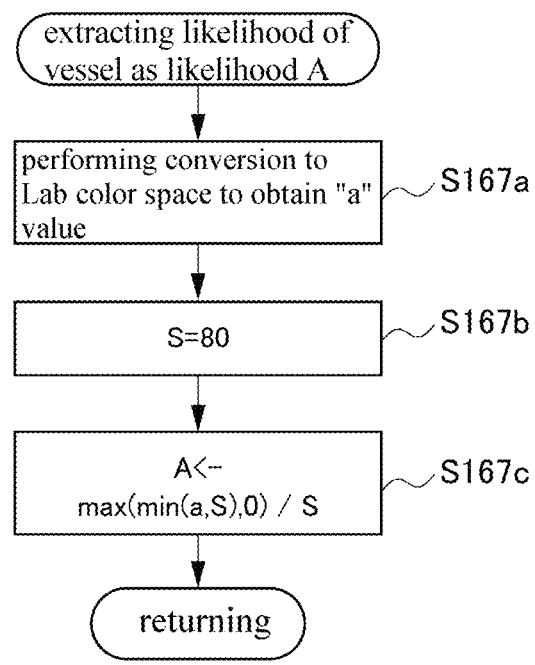
FIG. 5 is a flow chart illustrating a detailed procedure of extracting a likelihood of vessel as a likelihood A as defined in FIG. 4.

Referring to FIG. 5, the highlighting means 101d acquire the value of an a axis that corresponds to a direction of red-based color in Lab color space (Step S167a), and with respect to the likelihood of vessel (the likelihood A), set the value of the a within the range of from 0 to 1 via normalization with the limited range of from 0 to S (Step S167b, Step S167c). In this regard, S is, for example, 80. In the embodiment, the normalization is performed with limitation of the value of from 0 to 80. However, the above value is only non-restrictive example. Furthermore, the afore-mentioned processing of extracting the likelihood of vessel as the likelihood A may be performed in accordance with the flow chart of FIG. 9 which will be described below.

Returning to FIG. 4, a generating step will be hereinafter described. After determining the likelihood of vessel as the likelihood A according to the afore-mentioned procedure (Step S167), the second highlighting means 101f-2 determine a highlighting coefficient K3 of the detail component image D using the likelihood A (Step S168). The highlighting coefficient K3 can be determined in accordance with the following mathematical formula: K3=A*K2. In the above mathematical formula, a lower limit of the highlighting coefficient K3 is obtained by multiplying the coefficient K2 by LM1. In the above mathematical formula, LM1 has a range of from 0 to 1, and may be, for example, 0.5. In other words, K3 can be represented by the following mathematical formula: K3=max(K3, LM1). In the above mathematical formula, "max ( )" is a function returning maximum of two factors per an element. Since "LM1" is a scalar, it is subjected to expansion with the same value and dimension as the highlighting coefficient K3 (Step S169).

Subsequently, the highlighting means 101d perform the highlighting processing on the detail component image D using the highlighting coefficient K3 to generate the highlighted image D1 of the detail component image D (Step S170). In other words, the highlighted image D1 can be determined in accordance with the following mathematical formula: D1=D*K3. In the above mathematical formula, "*" represents a multiplication per an element.

Subsequently, the generating means 101e of the processing unit 101 add the highlighted (modified) base component image B1 to the highlighted (modified) detail component image D1 to acquire a modified brightness image L" (L"=B3+D1). Subsequently, based on the acquired, modified brightness image L", the value of the a axis corresponding to red-based color component and the value of the b axis corresponding to blue-based color component, conversion to the RGB color space is performed to generate an ultimate highlighted image E (Step S171).

In other words, the generating means 101e restore the brightness from the highlighted base component and detail component image, and use the color information component to generate the highlighted image. Furthermore, as shown in the display screen of FIG. 10, the processing unit 101 displays the captured image-displaying section 121 and the highlighted image-displaying section 122 in parallel on the display device 120.

Furthermore, as described above, the highlighting means 101d can perform the highlighting processing on either of the base component or the detail component. In more detail, the base component is subjected to the highlighting processing via brighter compression or the sharpness filter processing, and the detail component is subjected to the highlighting processing in accordance with the likelihood of vessel. In this regard, the generating means 101e does not necessarily require both of the highlighted base component and the highlighted detail component, and can restore the brightness from at least one of the highlighted base component and the highlighted detail component. For example, the generating means 101e may add the base component that is highlighted by the highlighting means 101d (image B2 or B3) to the detail component that is separated by the second separating means 101c (image D) to obtain the modified brightness image L".

In accordance with the afore-mentioned structure clarifying conversion processing, the processing unit 101 separates the captured image as memorized in the image-memorizing unit 102 into the brightness component and the color information component; separates the brightness component into the base component and the detail component; performs brighter compression processing or the sharpness filtering process on the base component; restores the brightness from the highlighted base component and the detail component; and generate the highlighted image using the color information component. As a result, as shown in the display screen of FIG. 10, the processing unit 101 displays the captured image-displaying section 121 and the highlighted image-displaying section 122 in parallel.

If the base component is highlighted such that it is subjected to compression in a manner brighter than the center value, the color of the vessel is maintained. On the other hand, if the base component is highlighted such that it is subjected to the sharpness filter processing, the base component in the image becomes sharp without being accompanied by any increase in minute noise. For the reasons, the physician can visually check a clear image with respect to, for example, linear vessel or punctate vessel, thereby causing the physician to make an easy and correct diagnosis. As a result, diagnostic accuracy is improved.

In the embodiment, the bilateral filter is used to separate the brightness component into the base component and the detail component. However, the bilateral filter may be replaced with other edge preserving smoothing filter such as an epsilon filter. Furthermore, while in the embodiment the Lab color space is used to acquire the brightness image, a brightness signal Y in YUV color space that is represented by the brightness signal and two color difference signals may be used without use of the Lab color space. Regarding the YUV color space, see internet URL: https://ja.wikipedia.org/wiki/YUV (accessed on Sep. 1, 2014).

While the a axis of the Lab color space is used as the likelihood of vessel (the likelihood A), it may be used an axis that is obtained by rotating the a axis in a plus direction of the b axis about (a1, b1). In this case, a1 may a value of from 10 to 50, b1 may be 0, and the amount of rotation may be from about 0.3 to 0.8 radian.

[Region Highlighting Conversion][Region Fluorescent Coloring Conversion]

Figure 6:
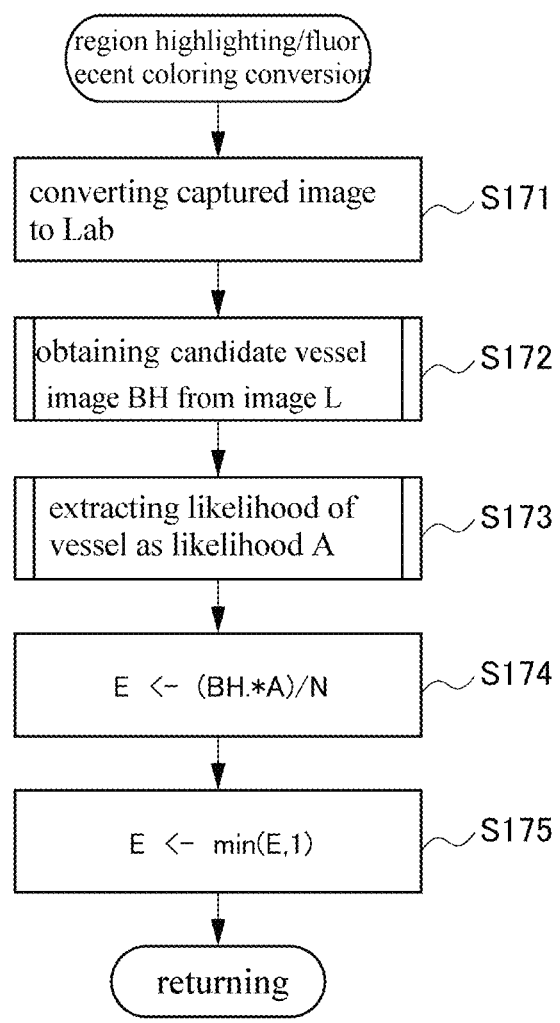
FIG. 6 shows a flow chart illustrating a detailed procedure of a region highlighting conversion processing/region fluorescent coloring conversion processing as defined in FIG. 2.

Next, the region highlighting conversion processing (i.e., the region highlighting conversion step) and the region fluorescent coloring conversion processing (i.e., the region fluorescent coloring conversion step) are described with reference to FIG. 6. Referring to FIG. 6, the first separating means 101*b* of the processing unit 101 convert the captured image from the RGB color space to the Lab color space in the first separation step (Step S171). Next, the extracting means 101*f* of the processing unit 101 extract the region selected as the object to be diagnosed.

Specifically, the first extracting means 101*f*-1 extract the candidate for the selected region (i.e., the candidate vessel) from the brightness component. To this end, the first extracting means 101*f*-1 perform a morphology processing (in this embodiment, a bottom-hat processing) on the image L that corresponds to the brightness in the Lab color space having undergone color space conversion due to the first separating means 101*b* to obtain a contrast-highlighted image BH (Step S172).

As the morphology processing is performed by applying structuring element(s) to an input image to generate the candidate vessel image BH as an output image having the same size as the input image, each value of the output image is based on comparison between the corresponding pixel and neighboring pixel(s) within the input image.

Most basic morphology processing is represented by dilation and erosion. The dilation is performed by adding a pixel to the boundary of the object within the input image, and the erosion is performed by removing a pixel from the boundary of the object. The number of the pixel(s) added to or removed from the object depends on a size and a shape of the structuring element used in the image processing.

In this case, a process of how the morphology processing using a bottom-hat processing is performed and the region selected as the object to be diagnosed (i.e., the candidate vessel) is extracted from the brightness component will be described. The detailed procedure of bottom-hat processing is illustrated in FIG. 7.

Figure 7:
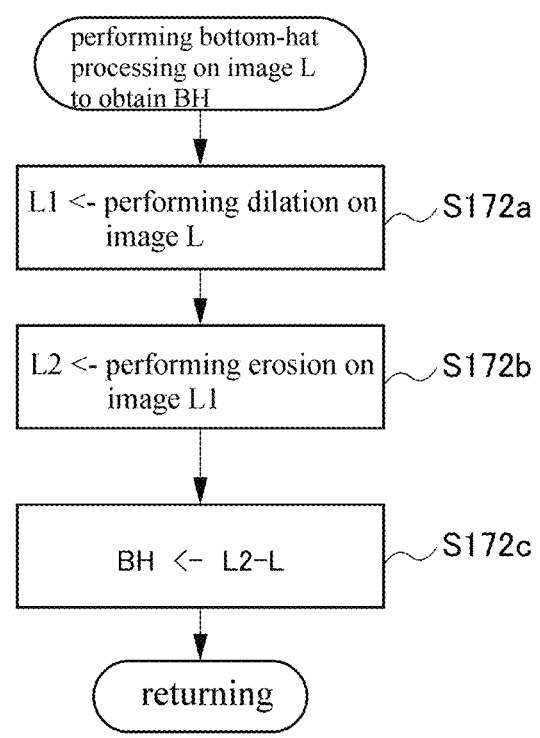
FIG. 7 is a flow chart illustrating a detailed procedure of performing a bottom-hat processing on a brightness image to obtain a brightness-highlighted image, as defined in FIG. 6.

Referring to FIG. 7, the first extracting means 101*f*-1 perform the dilation on the image L to obtain a processed brightness image L1 in the first extraction step of the extraction steps (Step S172-1). The details of the dilation are described in, for example, internet URL (http://www.mathworks.co.jp/jp/help/images/morphology-fundamentals-dilation-and-erosion.html) (accessed on Sep. 1, 2014)

Figure 8A:
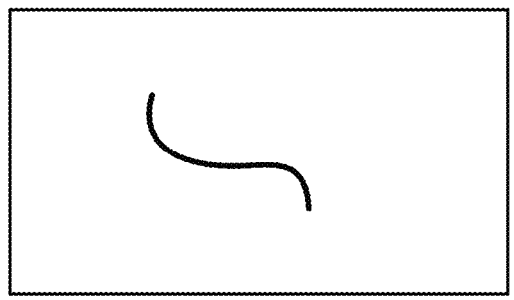
FIGS. 8A-8C are exemplary dilation-processed images.
Figure 8B:
Figure 8C:
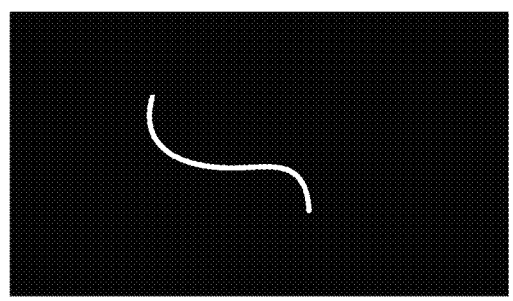

Next, the first extracting means 101*f*-1 perform the erosion on the dilation-processed brightness image L1 to obtain a brightness image L2 (Step S172*b*). Subsequently, the first extracting means 101*f*-1 subtract the image L from the erosion-processed brightness image L2 to obtain the bottom-hat processed image BH (BH=L2−L) (Step S172*c*), which is shown in FIGS. 8A-8C. FIG. 8A is the image L; FIG. 8B is the dilation-processed image L1; and FIG. 8C is the bottom-hat processed image BH.

The dilation is further explained. For example, the structuring element having a diameter of five dots is considered. The dilation means that the processing in which a maximum value of a notice pixel within the range of the structuring element(s) becomes a value of the notice pixel is performed on all the pixels. In other words, an output value of the notice pixel corresponds to the maximum value of all the pixels neighboring the input pixel. On the other hand, the erosion means that the processing in which a minimum value of a notice pixel within the range of the structuring element becomes a value of the notice pixel. In other words, the value of the notice pixel corresponds to the minimum value of all the pixels neighboring the input pixel. As mentioned above, the bottom-hat processing can be performed on the image L to obtain contrast-highlighted image BH.

Returning to FIG. 6, the second extracting means 101*f*-2 of the processing unit 101 extract the likelihood of the selected region (i.e., the likelihood of vessel) based on the color space composed of the brightness component and the color information component in the second extraction step out of the extraction steps. To this end, the second extracting means 101*f*-2 calculate the likelihood of vessel as the likelihood A (Step S173).

Figure 9:
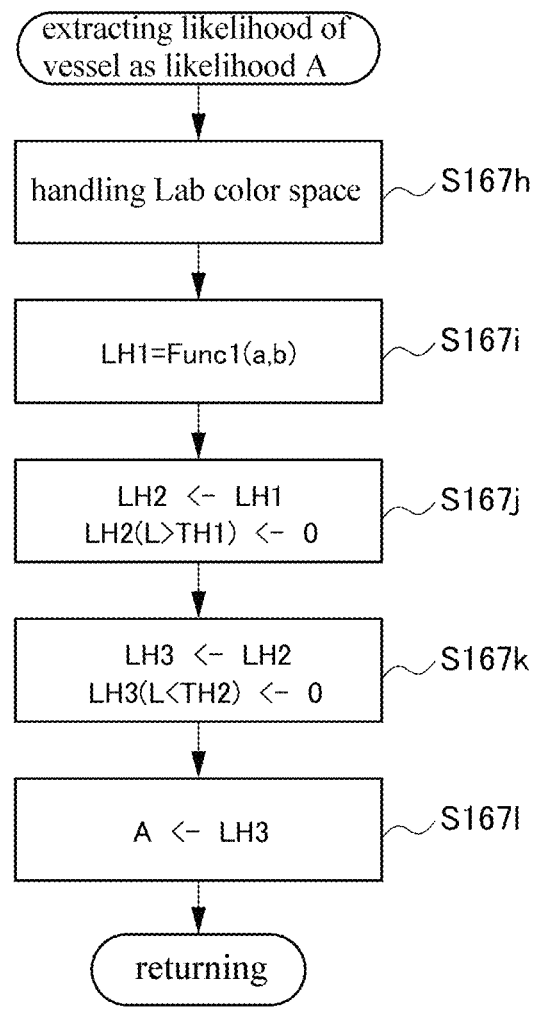
FIG. 9 is a flow chart illustrating a detailed procedure of extracting a likelihood of vessel as a likelihood A as defined in FIG. 6.

FIG. 9 depicts a detailed procedure of extracting the likelihood of vessel as the likelihood A as defined in Step S173. Referring to FIG. 9, after the first separating means 101*b* of the processing unit 101 perform a conversion of the captured image to Lab color space (Step S167*h*), the second extracting means 101*f*-2 of the processing unit 101 perform an extraction using the value of the a axis that is the color information component corresponding to a direction of red-based color in the color space and the value of the b axis that is the color information component corresponding to a direction of blue-based color in the color space. In other words, the second extracting means 101*f*-2 perform the following operation using the value of a axis and the value of b axis of the Lab color space to generate LH1 (Step S167*i*).

$$ad=(a-ca)*\cos(r)+b*\sin(r)+ca$$

$$bd=-(a-ca)*\sin(r)+b*\cos(r)$$

$$LH1=\exp(-((ad*ad)/sa/sa+(bd*bd)/sb/sb))$$

In the above operation, "ad" and "bd" are obtained by rotating an ab plane in an extent of r radian(s) in a counterclockwise direction around (ca, 0). In this regard, the value of "r" may be within the range from 0.3 radian to 0.8 radian. The value of "ca" may be within the range from 0 to 50. The "sa" and "sb" are a reciprocal of the sensitivity in the a axis direction and a reciprocal of the sensitivity in the b axis direction, respectively. In this embodiment, "sa" is greater than "sb".

Next, the second extracting means 101*b*-2 put a restriction on the resulting LH1 with the brightness L. If the brightness L is a threshold TH1 or above, LH1 (L=0) is LH2 (Step S167*j*). If the brightness L is the threshold TH2 or below, the LH2 is LH3 (Step S167*k*). The threshold TH1 is a value of range from 60 to 100, and the threshold TH2 is a value of range from 0 to 40. The LH3 as thus obtained becomes the likelihood A indicating the likelihood of vessel (Step S167*l*). Furthermore, in a case where the likelihood of vessel is extracted as the likelihood A, the procedure may follow the flow chart as shown in FIG. 5 using the structure clarifying conversion processing as described previously. In the embodiment the first extracting means 101*f*-1 perform the first extraction step and then the second extracting means 101*f*-2 perform the second extraction step. However, both of the first extraction step and the second extraction step are not necessarily performed, and either of the first extraction step or the second extraction step may be performed.

Returning to FIG. 6, after extracting the likelihood of vessel as the likelihood A in accordance with the aforementioned procedure (Step S173), the second extracting means 101*b*-2 multiply the bottom-hat processed image BH by each element of the likelihood A indicating the likelihood of vessel, and divide the result by a coefficient N (Step S174). Further, a highlighted image of vessel extraction E is generated by clipping with 1 (Step S175).

In accordance with the embodiment, the vessel-extracted image E is a multivalued image having a value of the range from 0 to 1. However, as the vessel-extracted image E has been subjected to the bottom-hat processing, the boundary of the extracted vessel is made steep. If the steeper boundary is desired, binarization with a desired threshold may be performed.

As described previously, the second extracting means 101*f*-2 calculates the likelihood A indicating the likelihood of vessel of the selected region by rotating plane coordinates which are composed of the red-based color direction and the blue-based color direction of the color space in an extent of predetermined angle in a counterclockwise direction about a predetermined point on the axis of the red-based color direction, and putting a restriction on the brightness component with the predetermined range of the value. The selected region is highlighted by multiplying the brightness image that is obtained by performing the bottom-hat processing on the image of the brightness component by the likelihood A as calculated.

Finally, the generating means 101*e* of the processing unit 101 combines the extracted result of the region with a background image to generate a reconstructed image, which is displayed on the display device 120. In this regard, the background image may be either of the captured image or a grayscale image of the captured image.

In the region highlighting conversion processing, the extracted result of the region is combined with a background image of the RGB color space to provide the vessel-highlighted image.

In the region fluorescent coloring conversion processing, the extracted result of the region is combined with a background image of the RGB color space to express the vessel in green color.

In accordance with the afore-mentioned region highlighting conversion processing and the region fluorescent coloring conversion processing, the first extracting means 101*f*-1 of the processing unit 101 extract the candidate for the selected region based on the brightness component and the second extracting means 101*f*-2 of the processing unit 101 extract the likelihood of the selected region based on the color space composed of the brightness component and the color information component. The processing unit 101 also displays the extracted result on the display device 120. For the reasons, the physician can visually check the screen on which the region selected as the object to be diagnosed is highlighted, thereby causing the physician to make an easy and correct diagnosis. As a result, diagnostic accuracy is improved.

Furthermore, the first extracting means 101*f*-1 of the processing unit 101 extract the candidate vessel using the morphology processing (i.e., the bottom-hat processing), and the second extracting means 101*f*-2 of the processing unit 101 calculates the likelihood of vessel. As the processing unit 101 extracts the area of vessel based on the likelihood A and the candidate vessel, clear shape change, pattern and etc. of the vessel can be reproduced.

Furthermore, the generating means 101*e* of the processing unit 101 combines the extracted result of the region with the background image to generate the reconstructed image, which is displayed on the display device 120. In this regard, the physician is provided with the captured image or the grayscale image of the captured image, and can dynamically modify the type of presentation according to a specific diagnostic purpose, thereby causing the physician to make an easy and correct diagnosis. As a result, diagnostic accuracy is further improved.

Figure 11:
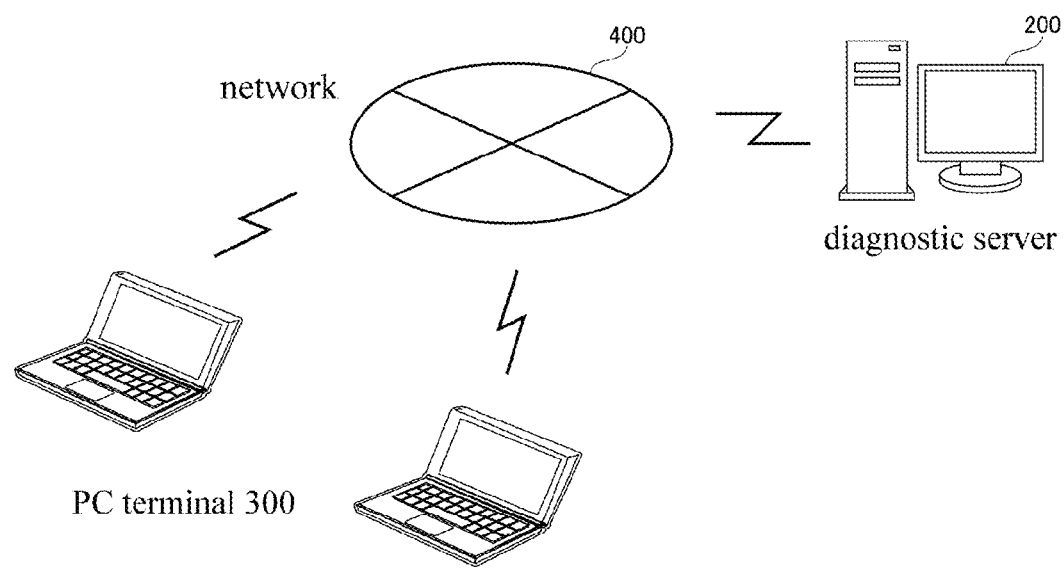
FIG. 11 shows a network configuration in which an embodiment of a diagnostic apparatus in accordance with the invention is systemized.

While in this embodiment the diagnostic apparatus 100 is fulfilled with a stand-alone configuration, it may be fulfilled with a type of a network using a server as a diagnostic site. FIG. 11 depicts an exemplary configuration of such a diagnostic system.

Referring to FIG. 11, a system has a diagnostic server 200 which is run and managed by a diagnosis site and a PC terminal 300 at a user side (e.g., a hospital or clinic) connected via a network 400 such as an internet protocol (IP) network to a diagnostic server 200. The PC terminal 300 uploads a captured image of an affected area which is captured by a dermoscope-equipped, image-capturing device (not shown) and transmits a request for diagnosis. After receiving the request for diagnosis, the diagnostic server 200 performs a diagnostic service by recognizing a pattern of the captured image to classify the pattern of the captured image into Type I, II, or III; performing an image conversion processing such as the structure clarifying conversion, the vessel highlighting conversion, and the vessel fluorescent coloring conversion depending on the classification (i.e., Type I, II, III); and transmitting an image as thus obtained to the PC terminal 300 having made the request for diagnosis via the network 400, as described previously in connection with the diagnostic apparatus 100. In this case, the user or use side can automatically obtain a converted image, which matches an image analysis and the classification of symptom, with fewer resources.

While in the embodiment the classification is made based on the stage of progression of the lesion, the classification may be made based on the pattern of the lesion suspected of a melanoma observed on the skin. The basic patterns of the lesion suspected of the melanoma may include, in terms of the overall construction or configuration, a reticular patter, a small spherical pattern, a cobblestone pattern, an uniform pattern, a parallel pattern, a starburst pattern, a multi-building pattern, and a non-specific pattern (see "Dermoscopy super easy guide" published by Ltd. Gakken Medical Shujunsha Co., Ltd. and authored by Masaru Tanaka).

Figure 12A:
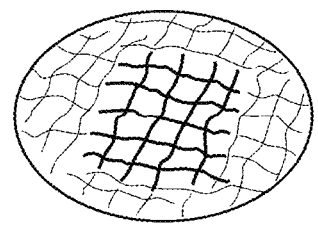
FIGS. 12A-12H show basic patterns of a cutaneous lesion.
Figure 12B:
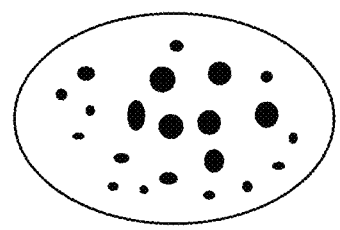
Figure 12C:
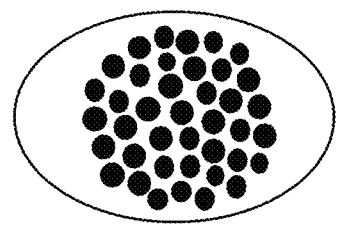
Figure 12D:
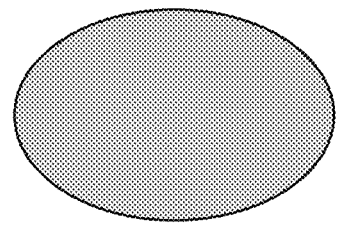
Figure 12E:
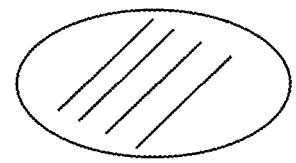
Figure 12F:
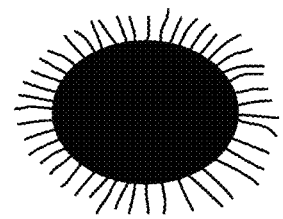
Figure 12G:
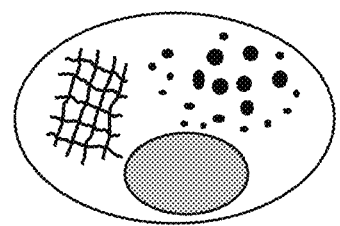
Figure 12H:
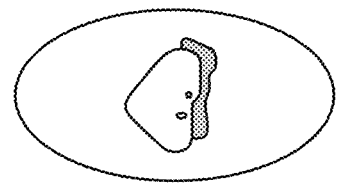

These patterns are classified based on the state of a nevus (i.e., a pigmented patch). In more detail, the reticular pattern as shown in FIG. 12A is a pattern where overall pigmented patch is net-like (i.e., pigmented network); the small spherical pattern as shown in FIG. 12B is a pattern where overall pigmented patch is composed of black, brown, or blue pigmented globules; the cobblestone pattern as shown in FIG. 12C is a pattern where pigmented globules closely placed and angulated to each other are accumulated to form overall pigmented patch; the regular pattern as shown in FIG. 12D is a pattern where there is substantially no structure with less biased color distribution; the parallel pattern as shown in FIG. 12E is a pattern where linear distribution is observed in parallel along the shape of skin in erythema of the palms and soles; the starburst pattern as shown in FIG. 12F is a pattern where the pigmented patch is circumferentially surrounded by stria; the multi-building pattern as shown in FIG. 12G is a pattern which is irregularly composed of three or more out of the afore-mentioned patterns; and the non-specific pattern as shown in FIG. 12H where any characteristic feature is not observed on the overall pigmented patch and does not belong to any of the pattern as described previously.

The image conversion processing can be performed on the captured image in accordance with the observed pattern. However, with respect to the reticular pattern, in order to highlight reticular shape or grid within the lesion a conversion for clarifying the reticular pattern or interval may be performed; with respect to the small spherical pattern, in order to highlight small sphere (i.e., a spot) within the lesion and clarify the difference in arrangement and size between small spheres a conversion that due to high sensitivity imaging capable of suppressing the change of color even a small sphere with a faint color is clarified may be performed; with respect to the parallel pattern, a conversion that linear patterns located in parallel within the lesion are highlighted may be performed; and with respect to the starburst pattern, in order to highlight the contour of the lesion and clarify the ciliary shape extending from the exterior thereof a conversion based on edge-highlighting and contour-highlighting may be performed, respectively.

EFFECT OF EMBODIMENT

As described previously, in accordance with the diagnostic apparatus 100 of the embodiment of the invention, the classifying means 101a of the processing unit 101 classify the captured image of the affected area to be diagnosed based on the stage of the progression or pattern of the lesion, and the image conversion processing corresponding to the classification as thus obtained is performed. For example, if the stage of the progression is classified as the low stage, the structure clarifying conversion processing is performed; if the stage of the progression is classified as the middle stage, the region highlighting conversion processing is performed; and if the stage of the progression is classified as the high stage, the region fluorescent coloring conversion processing is performed. As such, an appropriate or optimal processed image can be obtained depending on the stage of the progression or type of the lesion, thereby the physician to easily make a diagnosis and enhancing the accuracy of the diagnosis. Furthermore, the user or user side benefits from the configuration of the diagnostic system using the network with fewer resource.

The above Embodiment is given to illustrate the scope and spirit of the instant invention. This Embodiment will make apparent, to those skilled in the art, other embodiments and examples. These other embodiments and examples are within the contemplation of the invention. Therefore, the instant invention should be limited only by the appended claims.

100 . . . diagnostic apparatus; 101 . . . processing unit; 101a . . . classifying means; 101b . . . first separating means; 101c . . . second separating means; 101d highlighting means (101d-1 first highlighting means; 101d-2 second highlighting means); 101e generating means; 101f extracting means (101f-1 first extracting means; 101f-2 second extracting means); 110 . . . dermoscope-equipped, image-capturing device; 120 . . . display device; 121 . . . captured image-displaying section; 122 . . . processed image-displaying section; 130 . . . input device; 200 diagnostic server; 300 PC terminal; 400 network

The invention claimed is:

1. An image processing method in a diagnostic apparatus for diagnosing a lesion using a captured image of an affected area to be diagnosed, the method comprising:

performing an image conversion processing corresponding to a first state of disease on the captured image to generate a converted image, wherein the image conversion processing comprises a structure clarifying conversion process corresponding to the first state of disease, wherein the structure clarifying conversion process comprises:

performing a first separation process of separating the captured image into a brightness component and a color information component;

performing a second separation process of separating the brightness component into a base component and a detail component;

performing highlighting processing on the base component; and performing a generation process of restoring a brightness component based on a highlighting-processed base component and the detail component, and using the color information component to generate a highlighted image, and wherein in the generation process, the highlighting-processed base component is added to the detail component to restore the brightness component, and a conversion to a second color space is performed based on the restored brightness component and the color information component corresponding to a direction of a red-based color and a direction of a blue-based color in a first color space so as to generate the highlighted image.

2. The method according to claim 1, wherein the first state of disease is a state belonging to a low stage of progression of disease.

3. The method according to claim 1, further comprising:
classifying the captured image according to a stage of progression of disease,
wherein the captured image is memorized for each classified classification.

4. The method according to claim 3, wherein in the classifying, where the affected area is mole-shaped, and substantially composed of black or brown color, the captured image is classified as a low stage of progression.

5. The method according to claim 1, wherein the highlighting processing comprises at least one of a first highlighting process of compressing the base component in a manner brighter than a center value and a second highlighting process of performing a sharpness filter processing on the base component.

6. An image processing method in a diagnostic apparatus for diagnosing a lesion using a captured image of an affected area to be diagnosed, the method comprising:

performing an image conversion processing corresponding to a second state of disease on the captured image to generate a converted image, wherein the image conversion processing comprises a region highlighting conversion process corresponding to the second state of disease, wherein the region highlighting conversion process comprises:

performing a first separation process of separating the captured image into a brightness component and a color information component; and extracting a region to be diagnosed, wherein the extracting comprises a first extraction process of extracting a candidate for the region based on the brightness component, and a second extraction process of extracting a likelihood of the region based on a color space composed of the brightness component and the color information component, wherein in the region highlighting conversion process, the likelihood of the region is extracted using the color information component corresponding to a direction of a red-based color in a color space.

7. The method according to claim 6, wherein the second state of disease is a state belonging to a middle stage of progression.

8. The method according to claim 6, further comprising:
classifying the captured image according to a stage of progression of disease,
wherein the captured image is memorized for each classified classification.

9. The method according to claim 6, wherein, where the affected area is mole-shaped, and partially composed of vessels, the captured image is classified as a middle stage of progression.

10. An image processing method in a diagnostic apparatus for diagnosing a lesion using a captured image of an affected area to be diagnosed, the method comprising:
performing an image conversion processing corresponding to a third state of disease on the captured image to generate a converted image,
wherein the image conversion processing comprises a region fluorescent coloring conversion process corresponding to the third state of disease,
wherein the fluorescent coloring conversion process comprises:
performing a first separation process of separating the captured image into a brightness component and a color information component; and
extracting a region to be diagnosed,
wherein the extracting comprises a first extraction process of extracting a candidate for the region based on the brightness component to perform a bottom-hat processing on the candidate for the region extracted, and a second extraction process of extracting a likelihood of the region based on a color space composed of the brightness component and the color information component, and
wherein in the fluorescent coloring conversion process, the likelihood of the region is extracted using the color information component corresponding to the direction of a green-based color in the color space.

11. The method according to claim 10, wherein the third state of disease is a state belonging to a high stage of progression.

12. The method according to claim 10, further comprising:
classifying the captured image according to a stage of progression of disease,
wherein the captured image is memorized for each classified classification.

13. The method according to claim 10, wherein in the classifying, where the affected area is mole-shaped, and wholly composed of reddish vessels, the captured image is classified as a high stage of progression.

14. A diagnostic apparatus for diagnosing a lesion using a captured image of an affected area to be diagnosed, the diagnostic apparatus comprising a computer which is configured to:
(i) classify the captured image based on a stage of a progression of the lesion; and
(ii) perform an image conversion processing, which corresponds to a classification obtained as a result of the classifying, on the captured image to generate a converted image,
wherein the image conversion processing includes a structure clarifying conversion process which is image conversion processing corresponding to classification of a low stage of the progression,
wherein the structure clarifying conversion process comprises:
a first separation process of separating the captured image into a brightness component and a color information component;
a second separation process of separating the brightness component into a base component and a detail component;
a highlighting process of performing a highlighting processing on the base component; and
a generation process of restoring a brightness based on a highlighting-processed base component and the detail component, and using the color information component to generate a highlighted image,
wherein the highlighting process comprises at least one of a first highlighting process of compressing the base component in a manner brighter than a center value and a second highlighting process of performing a sharpness filter processing on the base component, and
wherein in the generation process, the highlighting-processed base component is added to the detail component to restore the brightness, and a conversion to a second color space is performed based on the brightness restored and the color information component corresponding to a direction of a red-based color and a direction of a blue-based color in a first color space so as to generate the highlighted image.

15. A diagnostic apparatus for diagnosing a lesion using a captured image of an affected area to be diagnosed, the diagnostic apparatus comprising a computer which is configured to:
(i) classify the captured image based on a stage of a progression of the lesion; and
(ii) perform an image conversion processing, which corresponds to a classification obtained as a result of the classifying, on the captured image to generate a converted image,
wherein the image conversion processing comprises a region highlighting conversion process which is image conversion processing corresponding to classification of a middle stage of the progression,
wherein the region highlighting conversion process comprises:
a first separating process of separating the captured image into a brightness component and a color information component; and
an extraction process of extracting a region to be diagnosed, wherein the extraction process comprises at least one of a first extraction process of extracting a candidate for the region based on the brightness component, and a second extraction process of extracting a likelihood of the region based on a color space composed of the brightness component and the color information component, and
wherein in the second extraction process the likelihood of the region is extracted using the color information component corresponding to a direction of a red-based color in a color space.

16. A diagnostic apparatus for diagnosing a lesion using a captured image of an affected area to be diagnosed, the diagnostic apparatus comprising a computer which is configured to:
(i) classify the captured image based on a stage of a progression of the lesion; and
(ii) perform an image conversion processing, which corresponds to a classification obtained as a result of the classifying, on the captured image to generate a converted image,
wherein the image conversion processing comprises a region fluorescent coloring conversion process that is image conversion processing corresponding to classification of a high stage of the progression,
wherein the region fluorescent coloring conversion process comprises:

a first separation process of separating the captured image into a brightness component and a color information component; and
an extraction process of extracting a region to be diagnosed,
wherein the extraction process comprises at least one of a first extraction process of extracting a candidate for the region based on the brightness component to perform a bottom-hat processing on the candidate for the region extracted, and a second extraction process of extracting a likelihood of the region based on a color space composed of the brightness component and the color information component, and
wherein in the second extraction process, the likelihood of the region is extracted using the color information component corresponding to the direction of a green-based color in the color space.

* * * * *